Dec. 4, 1923.

C. W. DAKE 1,476,394

ELECTRIC GENERATOR

Original Filed Aug. 20, 1919    2 Sheets-Sheet 1

Witness.
Edward T. Wray.

Inventor.
Charles W. Dake.
by
Attorneys.

Permanent Magnet

Witness
Edward T. Wray

Inventor
Charles W. Dake
by Parks & Carts
Attorneys

Patented Dec. 4, 1923.

1,476,394

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

ELECTRIC GENERATOR.

Original application filed August 20, 1919, Serial No. 318,651. Divided and this application filed May 21, 1920. Serial No. 383,135.

*To all whom it may concern:*

Be it known that I, CHARLES W. DAKE, a citizen of the United States, residing at Chicago, in the county of Cook and State of Illinois, have invented a certain new and useful Improvement in Electric Generators, of which the following is a specification, said application being a division of my Patent No. 1,446,787.

My invention relates to improvements in electric generators and has for one object to provide a new and improved form of electric generator which will be peculiarly efficient and satisfactory in operation and which in an induction type of generator, will enable the obtaining of very high current output from a peculiarly small type and size of generator.

I have illustrated a generator which can be used in connection with a motor generator set and its peculiarities of design result therefrom. Obviously, however, such a generator as this might be used in any desired connection and changes in design and proportion of parts might be necessary.

My invention is illustrated more or less diagrammatically in the accompanying drawings wherein.

Like parts are indicated by like characters throughout the drawings.

As above suggested, my generator is illustrated as broken away from the other parts of a motor generator set in which it might be located.

C is a cylindrical field magnet having a plurality of permanent magnetic poles $C^1$, $C^2$, $C^3$, $C^4$, $C^5$, $C^6$ and armature coils $C^7$ and $C^8$ associated with these pole pieces. This forms the field assembly or unit which is supported in the housing by the flanges $C^9$ and $C^{10}$, the flange $C^9$ slidably engages the annular bearing surface $C^{11}$ on the rib $C^{12}$ and the flange $C^{10}$ is rigidly held against the rib $C^{13}$ by a bearing housing support $C^{14}$. Thus the field magnet assembly is anchored in place only at one end and is free to slide at the other end while held in central position, this change in size and shape, caused by expansion and contraction of any of the parts will not in any way affect the operation.

Figure 1:
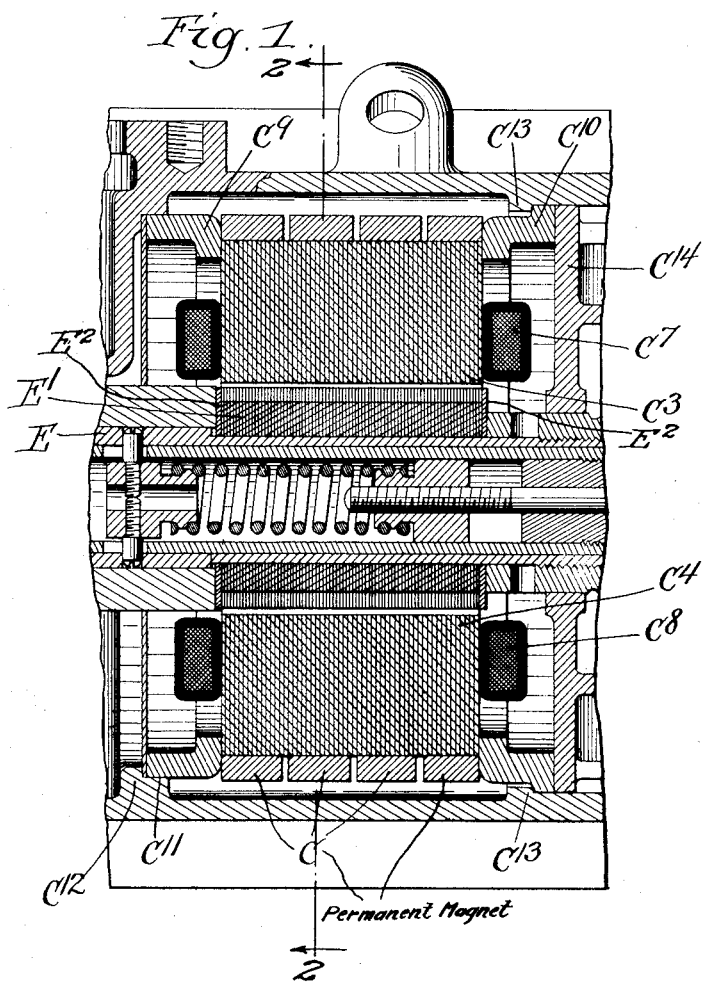
Figure 1 shows a longitudinal cross section.
Figure 2:
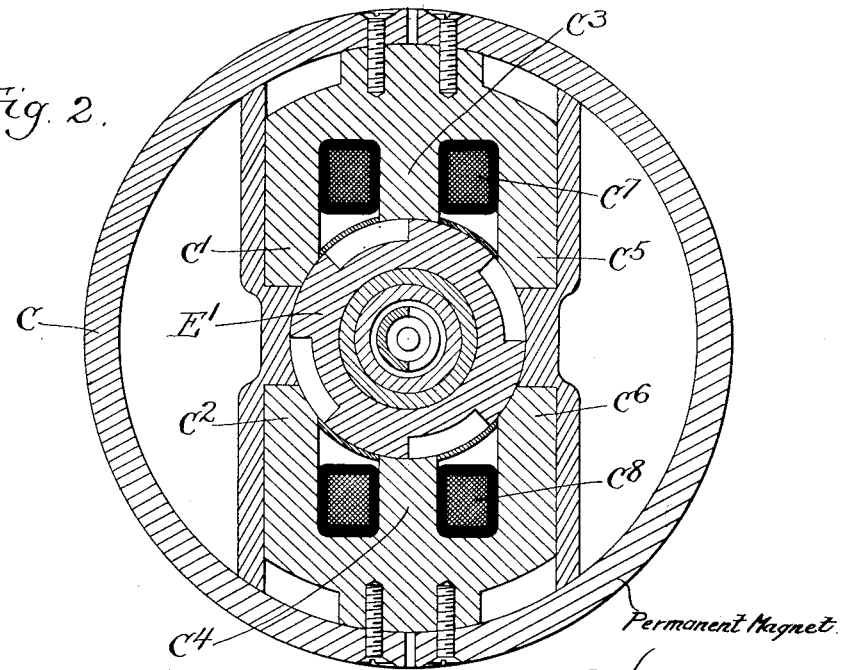
Figure 2 is a section along the line 2—2 of Figure 1.
Figure 3:
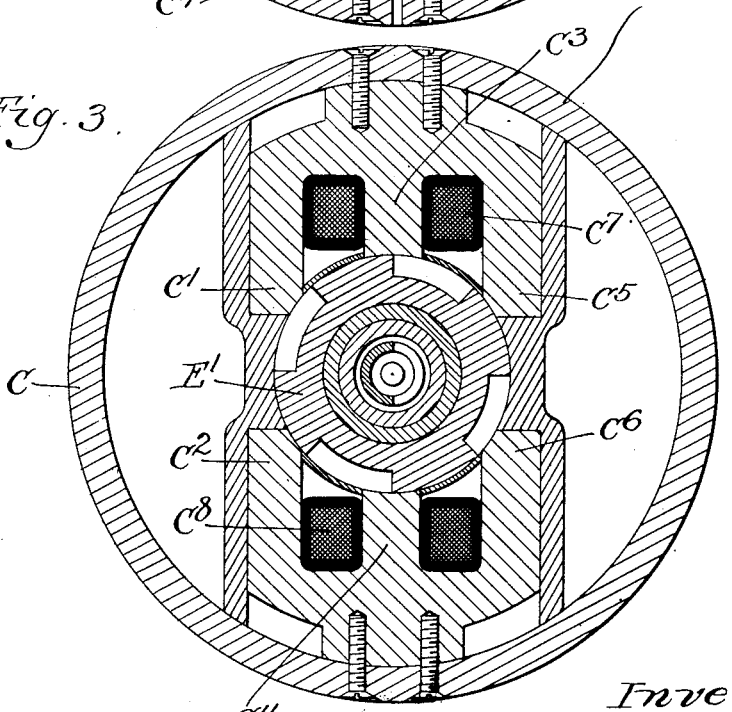
Figure 3 is a similar section with the position of the parts slightly changed.

$E^1$ is the rotor. It is more or less maltese cross shaped in cross section and is made up of a large number of very thin laminated steel or iron plates strung upon the sleeve E. It rotates in a closed smooth walled cylindrical chamber formed by the field magnet poles and filler blocks inserted between them. At either end of the rotor $E^1$ is a washer $E^2$. These washers form a closure for each end of the shallow channels formed in the face of the rotor and illustrated in Figures 2 and 3. The washers, by closing the ends of these channels prevent circulation of air longitudinally away from the ends of the rotor and thereby prevent the formation of eddy currents. The air, caught up in these smooth channels is whirled around and around within the smooth walled cylindrical chamber and does not escape from it. There thus is a minimum of power loss from eddy currents.

The dynamo here shown is an inductor generator used here for the purpose of obtaining the smallest possible generator for the current output required. Such a generator comprises like substantially all other generators, a fixed and a movable part.

The rotor is located within a cylindrical pocket having smooth walls formed partially by the pole pieces and partially by the spacing plugs or shields between them. The rotor itself is a smooth cylinder except for the thin longitudinal channels in its face located in opposition to the pole pieces and the closing rings or washers at either end of these channels, closing them off so that there is a minimum of resistance caused by windage, eddy currents, and the like.

I claim—

1. An electric generator comprising a rotor having a plurality of shallow longitudinal slots in the periphery thereof, flanges closing the ends of the slots and having substantially the same diameter as the balance of the rotor, field magnets surrounding the slotted portion of the rotor, there being working clearance between the faces of the magnets and the periphery of the rotor.

2. An electric generator comprising a rotor having a plurality of shallow longitudinal slots in the periphery thereof, flanges closing the ends of the slots and having substantially the same diameter as the balance of the rotor, field magnets surrounding the slotted portion of the rotor, there being working clearance between the faces of the magnets and the periphery of the rotor, a non-magnetic filling interposed between the field poles and adapted to complete and form a cylindrical chamber surrounding the rotor.

3. An electric generator comprising a plurality of field magnet poles, non-magnetic elements between them forming with the poles a smooth-walled cylindrical chamber, an irregular shaped rotor mounted for rotation therein, there being only working clearance between the walls of the chamber and the rotor, and means located at the opposed ends of the cylindrical chamber for preventing longitudinal displacement of air therethrough, said means being mounted for rotation with the rotor.

4. An electric generator comprising a plurality of field magnet poles, non-magnetic elements between them forming with the poles a smooth-walled cylindrical chamber, an irregular shaped rotor mounted for rotation therein, there being only working clearance between the walls of the chamber and the rotor, and means located at the opposed ends of the cylindrical chamber for preventing longitudinal displacement of air therethrough, said means comprising flanges on the rotor whose diameter is sufficiently less than the diameter of the cylinder to permit clearance in operation.

Signed at Chicago, county of Cook and State of Illinois, this 14th day of May, 1920.

CHARLES W. DAKE.